(12) United States Patent
Yaroshchuk et al.

(10) Patent No.: US 11,181,741 B1
(45) Date of Patent: Nov. 23, 2021

(54) ANGULARLY SELECTIVE DIMMING ELEMENT, METHOD OF FABRICATING THE SAME AND OPTICAL DEVICE CONTAINING THE SAME

(71) Applicant: Facebook Technologies, LLC, Menlo Park, CA (US)

(72) Inventors: Oleg Yaroshchuk, Menlo Park, CA (US); Barry David Silverstein, Menlo Park, CA (US); Alireza Moheghi, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/565,055

(22) Filed: Sep. 9, 2019

(51) Int. Cl.
   *G02B 27/01* (2006.01)
   *G02B 27/28* (2006.01)
   *G06T 19/00* (2011.01)
   *G02B 30/25* (2020.01)

(52) U.S. Cl.
   CPC ..... *G02B 27/0172* (2013.01); *G02B 27/0176* (2013.01); *G02B 27/286* (2013.01); *G02B 30/25* (2020.01); *G06T 19/006* (2013.01); *G02B 2027/0178* (2013.01)

(58) Field of Classification Search
   CPC  G02B 27/0172; G02B 30/25; G02B 27/0176; G02B 27/286; G02B 2027/0178; G06T 19/006
   USPC .......................................................... 345/8
   See application file for complete search history.

(56) References Cited

U.S. PATENT DOCUMENTS

| | | | | |
|---|---|---|---|---|
| 5,695,682 A | * | 12/1997 | Doane | C09K 19/02 252/299.01 |
| 2007/0188849 A1 | * | 8/2007 | May | G02F 1/133553 359/333 |
| 2012/0293868 A1 | * | 11/2012 | Wang | G02B 5/3041 359/485.03 |
| 2013/0077021 A1 | * | 3/2013 | Nakai | G02B 6/0078 349/62 |
| 2013/0300766 A1 | * | 11/2013 | Mukawa | G06T 19/006 345/633 |
| 2016/0011429 A1 | * | 1/2016 | Vdovin | H04N 13/349 359/462 |
| 2018/0172981 A1 | * | 6/2018 | Ishii | G02B 5/32 |
| 2018/0321431 A1 | * | 11/2018 | Kim | G02F 1/133528 |
| 2019/0227375 A1 | * | 7/2019 | Oh | G02B 1/00 |
| 2019/0346710 A1 | * | 11/2019 | Schleder | E06B 3/6722 |

OTHER PUBLICATIONS

L.O. Dolgov and O.V. Yaroshchuk, Light-Scattering Liquid-Crystal Composites with Reduced Off-Axis Haze, Journal of the SID, 14/7, 2006, pp. 1-6.

(Continued)

*Primary Examiner* — Kent W Chang
*Assistant Examiner* — Sujit Shah
(74) *Attorney, Agent, or Firm* — Millburn IP PLLC

(57) ABSTRACT

A method to suppress a rainbow effect and an optical device thereof are provided. The method includes receiving, by a dimming element, a light from a real world. The method further includes attenuating, by the dimming element, an intensity of the light with a degree of attenuation growing with an incidence angle. The dimming element includes a liquid crystal (LC) dimming element.

20 Claims, 8 Drawing Sheets

(56) References Cited

OTHER PUBLICATIONS

Kumar, P., et al., "Morphological and electro-optical responses of dichroic polymer dispersed liquid crystal films," Current Applied Physics, vol. 7, 636-642 (2007) (7 pages).

Fuh, A., et al., "Polarizer-free, electrically switchable and optically rewritable displays based on dye-doped polymer-dispersed liquid crystals," Optics Express, vol. 17, No. 9, Apr. 27, 2009, pp. 7088-7094 (7 pages).

Lee, S.-H., et al., "A Method for Improving Contrast Ratio of Polymer Dispersed Liquid Crystal Film Using the Oriented Azo-Dye Molecules in Polymer Matrix," Japanese Journal of Applied Physics, vol. 41, Pt. 1, No. 1, pp. 208-210 (2002) (3 pages).

Anonymous, "Vikuiti Overview," Universal Laser Systems, available online at URL: https://www.ulsinc.com/materials/vikuiti, retrieved on Jun. 29, 2021 (1 page).

\* cited by examiner

ANGULARLY SELECTIVE DIMMING ELEMENT, METHOD OF FABRICATING THE SAME AND OPTICAL DEVICE CONTAINING THE SAME

BACKGROUND

Augmented Reality (AR) headsets display a virtual image overlapping with real-world images or see-through images. Pupil-expansion waveguide displays with diffractive coupling structures are one of the most promising designs for AR displays, potentially offering sun/eye-glasses form factors, a moderately large field of view (FOV), and a large eye-box. One of the key challenges of these designs are see-through artifacts. Diffractive structures presented in AR headsets, such as a waveguide display, an eye-tracking combiner, may diffract light coming from a real world causing a multicolored glare in the see-through view, especially when a user wearing the AR headset looks at a bright light source from certain angles. Such a see-through artifact is often called "rainbow effect".

To suppress the rainbow effect, conventional dimming elements have been used to dim light incident onto the waveguide display at different incidence angles, thereby dimming undesired rainbow. However, the brightness of the desired see-through image may be reduced simultaneously. When the diffractive structure includes a polarization sensitive grating, the incident light may become polarized to dim the undesired rainbow, however, the brightness of the desired see-through image may also be reduced because a polarizing film may transmit only about 40% of the incident light.

BRIEF SUMMARY OF THE DISCLOSURE

One aspect of the present disclosure provides a method to suppress a rainbow effect. The method includes receiving, by a dimming element, a light from a real world. The method further includes attenuating, by the dimming element, an intensity of the light with an incidence angle. The dimming element includes a liquid crystal (LC) dimming element that enhances an attenuation of the light as the incidence angle increases.

Another aspect of the present disclosure provides an optical device. The optical device includes a dimming element configured to receive a light from a real world and attenuate an intensity of the light with an incidence angle. The dimming element includes a liquid crystal (LC) dimming element that enhances an attenuation of the light as the incidence angle increases.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1A:
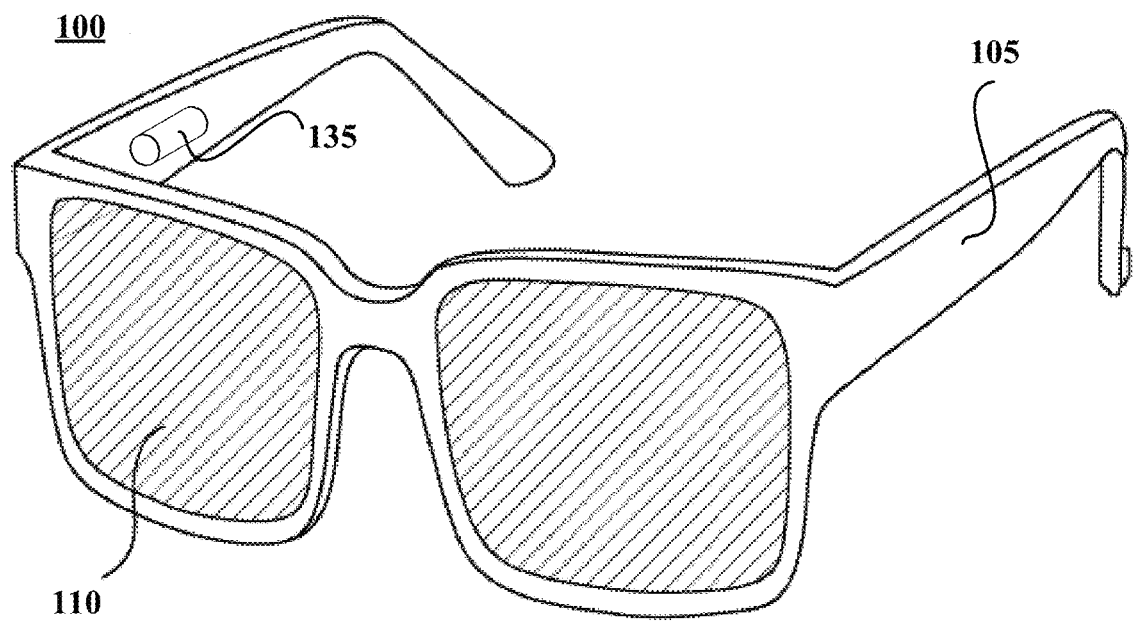
FIG. 1A illustrates a schematic diagram of a near-eye display (NED) according to an embodiment of the disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

As discussed in the background, diffractive structures presented in AR headsets, such as a waveguide display, an eye-tracking combiner, may diffract light coming from a real world causing a multicolored glare in the see-through view, especially when a user wearing the AR headset is looking at a bright light source from certain angles. Such rainbow effect significantly degrades the image quality of the see-through view. Inventors have found that the rainbow effect is mostly resulted from gratings at the waveguide display in an AR headset, especially from a large out-coupling grating that relays light from unintended sources of a real-world environment to eyes of a user. Ray tracing analysis shows that the critical in this sense is the light incident onto the waveguide at a high incidence angle (e.g., larger than 60°), because such an incident light is redirected to the user's eyes by the gratings. A substantially normally incident light onto the waveguide may be diffracted by the gratings only to a high angle that is out of user's sight.

In view of this, the present disclosure provides a method to suppress a rainbow effect in an optical device, e.g., an AR device. The method may include receiving, by a dimming element, a light from a real world. The method may further include attenuating by the dimming element an intensity of the light so that the degree of attenuation grows with an incidence angle. The dimming element includes a liquid crystal (LC) dimming element that enhances an attenuation of the light as the incidence angle increases. The method may further include converting, by a linear polarizer, the light from the real world to a linear polarized light to be received by the LC dimming element. The dimming element is a first dimming element, and the method may further include attenuating, by a second dimming element, the light from the real world depending on brightness of the real world. The second dimming element may be a tunable dimming element.

The present disclosure also provides an optical device which may be implemented into a near-eye display (NED). The optical device may include a dimming element configured to receive a light from a real world and attenuate an intensity of the light with an incidence angle. The dimming element may include an LC dimming element that enhances an attenuation of the light as the incidence angle increases. The optical device may further include a linear polarizer configured to convert the light from the real world to a linear polarized light to be received by the LC dimming element. The dimming element may be a first dimming element. The optical device may further include a second dimming element configured to attenuate the light from the real world depending on brightness of the real world. The second dimming element may be a tunable dimming element.

FIG. 1A illustrates a schematic diagram of a near-eye display (NED) 100 according to an embodiment of the disclosure. In some embodiments, the NED 100 may be referred to as a head-mounted display (HMD). The NED 100 may present media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 acts as a virtual reality (VR) device, an augmented reality (AR) device or a mixed reality (MR) device, or some combination thereof. In some embodiments, when the NED 100 acts as an AR or a MR device, portions of the NED 100 and its internal components may be at least partially transparent.

As shown in FIG. 1A, the NED 100 may include a frame 105 and a display 110. Certain device(s) may be omitted, and other devices or components may also be included. The frame 110 may include any appropriate type of mounting structure to ensure the display 110 to be viewed as a near-eye display (NED) by a user. The frame 105 may be coupled to one or more optical elements which together display media to users. In some embodiments, the frame 105 may represent a frame of eye-wear glasses. The display 110 is configured for users to see the content presented by the NED 100. As discussed below in conjunction with FIG. 1B, the display 110 may include at least one display assembly (not shown) for directing image light to an eye of the user. In some embodiments, the at least one display assembly may be a projection system. For illustrative purposes, FIG. 1A shows the projection system may include a projector 135 that is coupled to the frame 105.

Figure 1B:
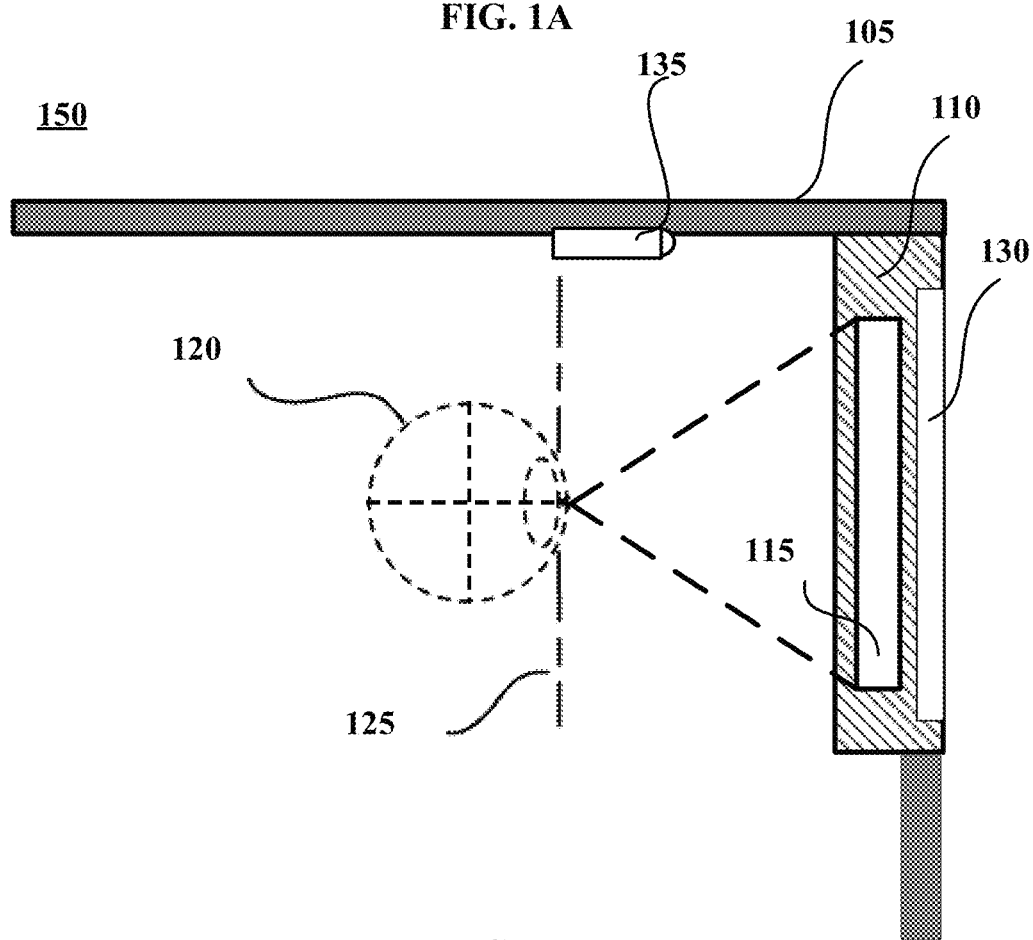
FIG. 1B illustrates a cross-sectional view of the NED in FIG. 1A according to an embodiment of the disclosure.

FIG. 1B is a cross-section 150 of the NED 100 shown in FIG. 1A according to an embodiment of the disclosure. The display 110 may include at least one waveguide display assembly 115. An exit pupil 125 may be a location where the eye 120 is positioned in an eye-box region when the user wears the NED 100. For purposes of illustration, FIG. 1B shows the cross section 150 associated with a single eye 120 and a single waveguide display assembly 115, but in alternative embodiments not shown, another display assembly which is separate from the waveguide display assembly 115 shown in FIG. 1B, may provide image light to an eye-box located at an exit pupil of another eye of the user.

The waveguide display assembly 115, as illustrated below in FIG. 1B, is configured to direct the image light to an eye-box located at the exit pupil 125 of the eye 120. The waveguide display assembly 115 may be composed of one or more materials (e.g., plastic, glass, etc.) with one or more refractive indices that effectively minimize the weight and widen a field of view (FOV) of the NED 100. In some embodiments, the waveguide display assembly 115 may be a component (e.g., the display 110) of the NED 100. In some embodiments, the waveguide display assembly 115 may be part of some other NED, or other system that directs display image light to a particular location. As shown in FIG. 1B, the waveguide display assembly 115 may be for one eye 120 of the user. The waveguide display assembly 115 for one eye may be separated or partially separated from the waveguide display assembly 115 for the other eye. In certain embodiments, a single waveguide display assembly 115 may be used for both eyes 120 of the user.

In some embodiments, the NED 100 may include one or more optical elements between the waveguide display assembly 115 and the eye 120. The optical elements may act to, e.g., correct aberrations in image light emitted from the waveguide display assembly 115, magnify image light emitted from the waveguide display assembly 115, some other optical adjustment of image light emitted from the waveguide display assembly 115, or some combination thereof. The example for optical elements may include an aperture, a Fresnel lens, a convex lens, a concave lens, a filter, or any other suitable optical element that affects image light. In some embodiments, the NED 100 may include an adaptive dimming device 130, which may be a global or local dimming device. The adaptive dimming device 130 may be tunable by an external field, for example, an electric field, a magnetic field, or a light. The adaptive dimming device 130 may dynamically adjust the transmittance of the see-through view observed through the NED 100, thereby switching the NED 100 between a VR device and an AR device or between a VR device and a MR device. In some embodiments, with switching between the AR/MR device and the VR device, the adaptive dimming device 130 may be used in the AR device to mitigate difference in brightness of the see-through view and the virtual image. In some embodiments, the adaptive dimming device 130 may dynamically attenuate a light from the real-world environment depending on brightness of the real-world environment, thereby adjusting the brightness of the see-through view. The adaptive dimming device 130 may include any suitable adaptive dimming devices, such as a guest-host type liquid crystal dimming device, a polarizer based liquid crystal type diming device, an electrochromic diming device, or a photochromic diming device, etc. Exemplary waveguide display assembly 115 will be described in detail in conjunction with FIG. 2 and FIG. 3.

Figure 2:
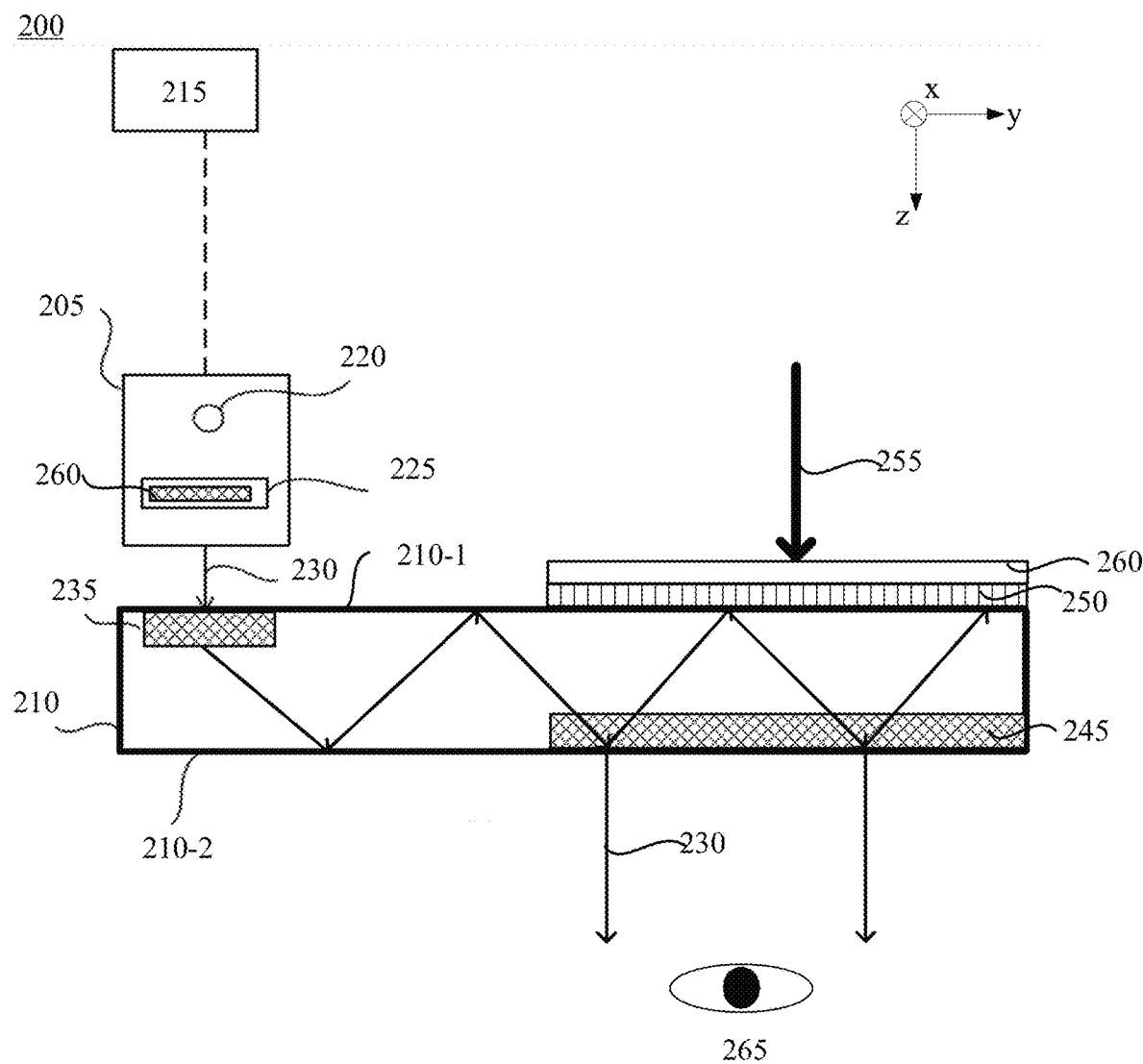
FIG. 2 illustrates a schematic diagram of a waveguide display assembly in a NED according to an embodiment of the disclosure.

FIG. 2 illustrates a schematic diagram of a waveguide display assembly 200 according to an embodiment of the disclosure. The waveguide display assembly 200 may be the waveguide display assembly 115 in FIG. 1B. As shown in FIG. 2, the waveguide display assembly 200 may include a source assembly 205, a waveguide 210, an angularly selective dimming element 250, and a controller 215. The source assembly 205 may include a source 220 and an optics system 225. The source 220 may be a light source that generates coherent or partially coherent light. The source 220 may include, e.g., a laser diode, a vertical cavity surface emitting laser, and/or a light emitting diode. In some embodiments, the source 220 may be a display panel, such as a liquid crystal display (LCD) panel, an liquid-crystal-on-silicon (LCoS) display panel, an organic light-emitting diode (OLED) display panel, a micro light-emitting diode (micro-LED) display panel, a digital light processing (DLP) display panel, or some combination thereof. In some embodiments, the source 220 may be a self-emissive panel, such as an OLED display panel or a micro-LED display panel. In some embodiments, the source 220 may be a display panel that is illuminated by an external source, such as an LCD panel, an LCoS display panel, or a DLP display panel. Examples of an external sources may include a laser, an LED, an OLED, or some combination thereof. The optics system 225 may include one or more optical components that condition the light from the source 220. Conditioning light from the source 220 may include, e.g., transmitting, attenuating, expanding, collimating, and/or adjusting orientation in accordance with instructions from the controller 215.

The source assembly 205 may generate image light 230 and output the image light 230 to an in-coupling element 235 located at the waveguide 210. The waveguide 210 may expanded image light 230 to an eye 265 of the user. The waveguide 210 may receive the image light 230 at one or more in-coupling elements 235 located at the waveguide 210, and guide the received image light 230 to an out-coupling element 245 located at the waveguide 210, such that the received input image light 230 is decoupled out of the waveguide 210 towards the eye 265 via the out-coupling element 245.

In some embodiments, the in-coupling element 235 may couple the image light 230 from the source assembly 205 into the waveguide 210. The waveguide 210 may include a first surface 210-1 facing the real-world and an opposing second surface 210-2 facing the eye 265. The in-coupling element 235 may be part of, or affixed to, the first surface 210-1 or the second surface 210-2 of the waveguide 210. In some embodiments, as shown in FIG. 2, the in-coupling element 235 may be part of, or affixed to, the first surface 210-1 of the waveguide 210. In some embodiments, the in-coupling element 235 may be part of, or affixed to, the second surface 210-2 of the waveguide 210. The in-coupling element 235 may include, for example, a surface relief grating, a volume hologram, a polarization grating, a polarization volume hologram, a metasurface grating, or other types of diffractive elements, or some combination thereof. In some embodiments, the in-coupling element 235 may include a diffraction grating, and a pitch of the diffraction grating may be chosen such that the total internal reflection occurs in the waveguide 210, and the image light 230 may propagate internally in the waveguide 210 (e.g., by total internal reflection). The in-coupling element 235 is also referred to as an in-coupling grating.

The out-coupling element 245 may be part of, or affixed to, the first surface 210-1 or the second surface 210-2 of the waveguide 210. In some embodiments, as shown in FIG. 2, the out-coupling element 245 may be part of, or affixed to, the second surface 210-2 of the waveguide 210. In some embodiments, the out-coupling element 245 may be part of, or affixed to, the first surface 210-1 of the waveguide 210. In some embodiments, the out-coupling element 245 may include a surface relief grating, a volume hologram, a polarization grating, a polarization volume hologram, a metasurface grating, or other types of diffractive elements, or some combination thereof. In some embodiments, the out-coupling element 245 may include a diffraction grating, and the pitch of the diffraction grating may be configured to cause the incident image light 230 to exit the waveguide 210, i.e., redirecting image light 230 so that total internal reflection no longer occurs. Such a grating is also referred to as an out-coupling grating.

Figure 3:
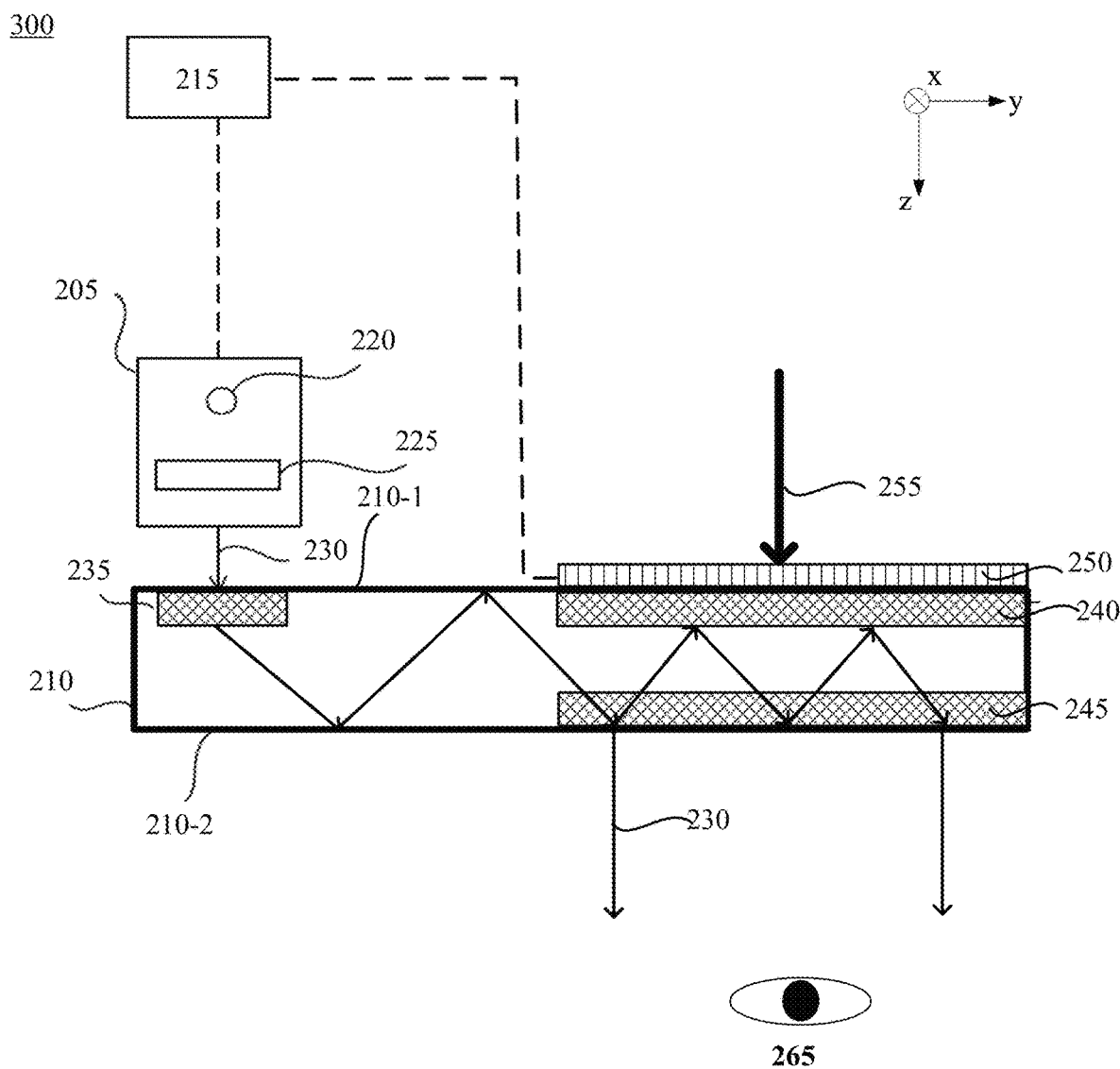
FIG. 3 illustrates a schematic diagram of a waveguide display assembly in a NED according to another embodiment of the disclosure.

In some embodiments, the waveguide display assembly 200 may include additional gratings which redirect/fold and/or expand the pupil of the projector 205, and an exemplary structure may be described in detail in conjunction with FIG. 3. In some embodiments, multiple functions, e.g., redirecting/folding and/or expanding the pupil of the projector 205 may be combined into a single grating, e.g. an out-coupling grating. In some embodiments, some above-mentioned gratings may be divided in several sections (subgratings), for example for tiling field of view (FOV).

The waveguide 210 may be composed of one or more materials that facilitate total internal reflection of the image light 230. The waveguide 210 may be composed of, for example, plastic, glass, and/or polymers. The waveguide 210 may have a relatively small form factor. For example, the waveguide 210 may be approximately 50 mm wide along the x-dimension, 30 mm long along the y-dimension and 0.5-1 mm thick along the z-dimension.

The controller 215 may control the operation of the source assembly 205. In some embodiments, the waveguide 210 may output the expanded image light 230 to the eye 265 with a large field of view (FOV). For example, the expanded image light 230 may be provided to the eye 265 with a diagonal FOV (in x and y) of 60 degrees or greater and/or 150 degrees or less. The waveguide 210 may be configured to provide an eye-box with a width of 8 mm or greater and/or equal to or less than 50 mm, and/or a height of 6 mm or greater and/or equal to or less than 20 mm.

In some embodiments, the waveguide display assembly 200 may include a plurality of source assemblies 205 and a plurality of waveguides 210. Each of the source assemblies 205 may emit a monochromatic image light of a specific wavelength band corresponding to a primary color (e.g., red, green, or blue). The plurality of waveguides 210 may be stacked together and separated by a gap to output an expanded image light 230 that is multi-colored. In some embodiments, the plurality of waveguides 210 may be separated by air gaps. In some embodiments, the plurality of waveguides 210 may be separated by a low refractive index material, such as a nanoporous film. In some embodiments, the waveguide display assembly 200 may include a stack of waveguides, where each waveguide is designed to handle, e.g., some portion of the field of view and color spectrum of the virtual image. Using the waveguide display assembly 200, the physical display and electronics may be moved to the side of the front rigid body and a fully unobstructed view of the real world may be achieved, therefore opening up the possibilities to true AR experiences.

The angularly selective dimming element 250 may be disposed at the first side of the waveguide 210, i.e., the side facing the see-through real-world. The angularly selective dimming element 250 may be applied directly to a diffraction element (e.g., the out-coupling element 245) or an optical element disposed adjacent to the diffraction element. The angularly selective dimming element 250 may be in a direct contract with the diffraction element (e.g., the out-coupling element 245) or may be spaced apart from the diffraction element (e.g., the out-coupling element 245) by a gap. For illustrative purposes, FIG. 2 shows the angularly selective dimming element 250 is disposed at the first side 210-1 of the waveguide 210, and arranged opposed to the out-coupling element 245 and spaced apart from the out-coupling element 245 by a gap. A light 255 from a real world (referred to as a real-world light) may be incident onto the angularly selective dimming element 250 and dimmed by the angularly selective dimming element 250, then propagate to the out-coupling element 245. In some embodiments, the angularly selective dimming element 250 may be applied directly to the out-coupling element 245.

The angularly selective dimming element 250 may be configured to attenuate the intensity of an incident light with an incidence angle, for example, through absorption, scattering, or reflection, or some combination thereof. That is, the attenuation of the incident light caused by the angularly selective dimming element 250 may be resulted from absorption, scattering, or reflection, or some combination thereof. In some embodiments, the angularly selective dimming element 250 may be configured to enhance the attenuation of the incident light as the incidence angle increases. In some embodiments, the angularly selective dimming element 250 may be configured to significantly attenuate or completely block an obliquely incident light having a high incidence angle (e.g., larger than 60°), and negligibly attenuate or slightly attenuate a substantially normally incident light. The transmittance of the obliquely incident light having a high incidence angle (e.g., larger than 60°) and the transmittance of the substantially normally incident light may depend on the type of the angularly selective dimming element 250 and the polarization state of the incident light. In some embodiments, for a guest-host type angularly selective dimming element, the light transmittance of the p-polarized obliquely incident light having a high incidence angle (e.g., larger than 60°) and the substantially normally incident light may be lower than about 3% and higher than about 35%, respectively. In some embodiments, for a polymer-dispersed liquid crystal (PDLC) type angularly selective dimming element, the light transmittance of the obliquely incident p-polarized light having a high incidence angle (e.g., larger than 60°) and the substantially normally incident light may be lower than about 60% and higher than about 95%, respectively.

The angularly selective dimming element 250 may be disposed in an optical path of the real-world light 255 to angularly selectively attenuate the real-world light 255 before the real-world light 255 is incident onto the diffraction element (e.g., the out-coupling element 245). Thus, the real-world light 255 that is incident onto the angularly selective dimming element 250 at a high incidence angle (e.g., larger than 60°) may be significantly attenuated or completely blocked, while the real-world light 255 that is substantially normally incident ono the angularly selective dimming element 250 may be negligibly attenuated or slightly attenuated. That is, a substantial portion of the angular space corresponding to the incidence angles larger than the high incidence angle (e.g., larger than 60°) may be dimmed or completely blocked by the angularly selective dimming element 250, while the substantially normally incident light may be negligibly attenuated or slightly attenuated by the angularly selective dimming element 250. Thus, the undesired rainbow caused by the diffractive structures (e.g. gratings) at the waveguide 210 may be dimmed, while the brightness of the desired see-through image may be only slightly reduced.

In some embodiments, the angular dependence of the angularly selective dimming element 250 may be polarization selective/sensitive, for example, the angular dependence of the angularly selective dimming element 250 may be stronger for an incident light having a certain polarization than other polarizations. To enhance the angular selectivity, the angularly selective dimming element 250 may be optically coupled with a polarizer. In one embodiment, as shown in FIG. 2, a polarizer 260 may be coupled to the angularly selective dimming element 250, the polarizer 260 may convert the real-world light 255 to a polarized light propagating towards the angularly selective dimming element 250. A transmission axis of the polarizer 260 may be orientated relative to the angularly selective dimming element 250, such that the angular dependence of the angularly selective dimming element 250 may be maximized for the polarized light transmitted through the polarizer 260. In some embodiments, the polarizer 260 may be a linear polarizer. In some embodiments, the angularly selective dimming element 250 may be combined with an electrically or optically tunable dimming element (e.g., the adaptive dimming device 130 in FIG. 1B) used to attenuate the real-world light at a bright environment, thereby additionally attenuating the real-world light 255 depending on brightness of environment.

In some embodiments, the angularly selective dimming element 250 may be an active element, and the attenuation of the incident light may be tunable by, for example, an external electric field, an external light, or an external magnetic field or some combination thereof. That is, the angularly selective dimming element 250 may have tunable angular characteristic. In some embodiments, the angularly selective dimming element 250 may be a passive element, and the angularly selective dimming element 250 may have fixed angular characteristic.

FIG. 3 illustrates a schematic diagram of another waveguide display assembly in a NED according to an embodiment of the disclosure. The similarities between FIG. 2 and FIG. 3 are not repeated, while certain difference may be explained. As shown in FIG. 3, the waveguide display assembly 200 may further include a directing element 240 that redirects the received input image light 230 to the out-coupling element 245, such that the received input image light 230 is decoupled out of the waveguide 210 via the out-coupling element 245. The directing element 240 may be part of, or affixed to, the first side 210-1 of the waveguide 210. The out-coupling element 245 may be part of, or affixed to, the second side 210-2 of the waveguide 210, such that the directing element 240 is arranged opposed to the out-coupling element 245.

In some embodiments, the directing element 240 and the out-coupling element 245 may be structurally similar. The directing element 240 may include, for example, a surface relief grating, a volume hologram, a polarization grating, a polarization volume hologram, a metasurface grating, or other types of diffractive elements, or some combination thereof. In some embodiments, the directing element 240 may be a diffraction grating, the pitch of the diffraction grating is chosen to cause incident image light 230 to exit the waveguide 210 at angle(s) of inclination relative to a surface of the out-coupling element 245. The directing element 240 is also referred to as a folding grating. The angularly selective dimming element 250 may be disposed at the first side 210-1 of the waveguide 210, and may be arranged opposed to the out-coupling element 245 and the directing element 240. The real-world light 255 may be angularly selectively attenuated by the angularly selective dimming element 250, and then incident onto the directing element 240 and the out-coupling element 245. Thus, the undesired rainbow caused by the diffractive structures (e.g. the directing element 240 and the out-coupling element 245) at the waveguide 210 may be dimmed, while the brightness of the desired see-through image may be only slightly reduced.

The angularly selective dimming element 250 may be any appropriate dimming element capable of attenuating an incident light with an incidence angle. In some embodiments, the angularly selective dimming element 250 may be a liquid crystal (LC)-based angularly selective dimming element. In some embodiments, the angularly selective dimming element 250 may be configured to attenuate the incident light through absorption. For example, the angularly selective dimming element 250 may include a homeotropically aligned guest-host LC layer doped with dyes (e.g., dichroic dyes). In some embodiments, the angularly selective dimming element 250 may be configured to attenuate the incident light through scattering. For example, the angularly selective dimming element 250 may include a layer of polymer dispersed liquid crystal (PDLC) composite having homeotropically aligned LC droplets, where the ordinary refractive index ($n_o$) of LC is chosen to substantially match (i.e., match or is close to) the refractive index of the polymer for a substantially normally incident light. In some embodiments, the angularly selective dimming element 250 may be configured to attenuate the incident light through absorption and scattering. For example, the angularly selective dimming element 250 may include a layer of PDLC composite having homeotropically aligned droplets including nematic LCs and dyes (e.g., dichroic dyes). Exemplary angularly selective dimming elements will be explained in the following description.

Figure 4A:
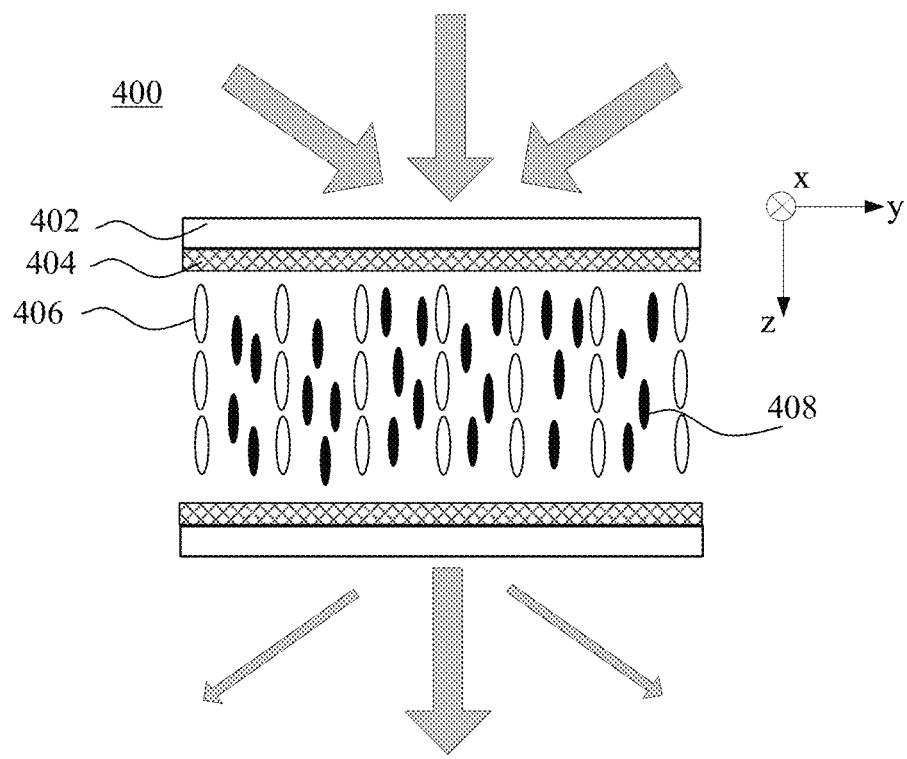
FIG. 4A illustrates a schematic diagram of an angularly selective dimming element according to an embodiment of the disclosure.

FIG. 4A illustrates a schematic diagram of an angularly selective dimming element 400 according to an embodiment of the disclosure. The angularly selective dimming element 400 may be configured to attenuate an incident light with an incidence angle through absorption. As shown in FIG. 4A, the angularly selective dimming element 400 may include two opposite substrates 402 and an LC layer sandwiched between the two opposite substrates 402. Each substrate 402 may be disposed with an alignment layer 404 that enables an alignment of the LC layer. The LC layer may be a guest-host LC layer that includes a mixture of host LCs 406 and guest dyes (e.g., dichroic dyes) 408 doped into the LCs 406. The LCs 406 may be homeotropically aligned, and the molecules of dichroic dyes 408 may be aligned together with the LC molecules 406 to have a perpendicular or homeotropic orientation. The LCs 406 have positive dielectric anisotropy ($\Delta\varepsilon>0$) or negative dielectric anisotropy ($\Delta\varepsilon<0$).

The dichroic dyes 408 are organic molecules that show an anisotropic absorption. The absorption properties of the dichroic dyes 408 may depend on its orientation relative to an incident light. The dichroic dyes 408 may strongly absorb an incident light polarized (or having E-field) parallel to an absorption axis (e.g., long axis or short axis) of the molecules of the dichroic dyes 408, and weakly absorb the incident light an incident light polarized (or having E-field) perpendicular to an absorption axis (e.g., long axis or short axis) of the molecules of the dichroic dyes 408. Positive dichroic dyes 408 may have the long axis of the molecules as the absorption axis, and negative dichroic dyes 408 may have the short axis of the molecules as the absorption axis. For illustrative purpose, FIG. 4A shows the dichroic dyes 408 are positive dichroic dyes whose absorption axis is the long axis of the dye molecules.

The LCs 406 may include active LCs or passive LCs (e.g., reactive mesogens). When the active LCs change their orientation, for example, by an external electric field generated between the electrodes disposed at the substrates of the angularly selective dimming element, the orientation of the dichroic dyes 408 may also change with the LC molecules, consequently, the absorption axis orientation may be changed, for example, from a weakly-absorbing/perpendicular orientation to a strongly-absorbing/planar orientation. That is, the light transmittance of the angularly selective dimming element 400 may be modulated by rotating the dichroic dye molecules within a voltage-controllable liquid crystal cell. In this case, the angularly selective dimming element 400 may be an active element having tunable angular characteristic, an exemplary structure will be explained in FIG. 5. For illustrative purpose, FIG. 4A shows the angularly selective dimming element 400 is a passive element having fixed angular characteristic.

Figure 4B:
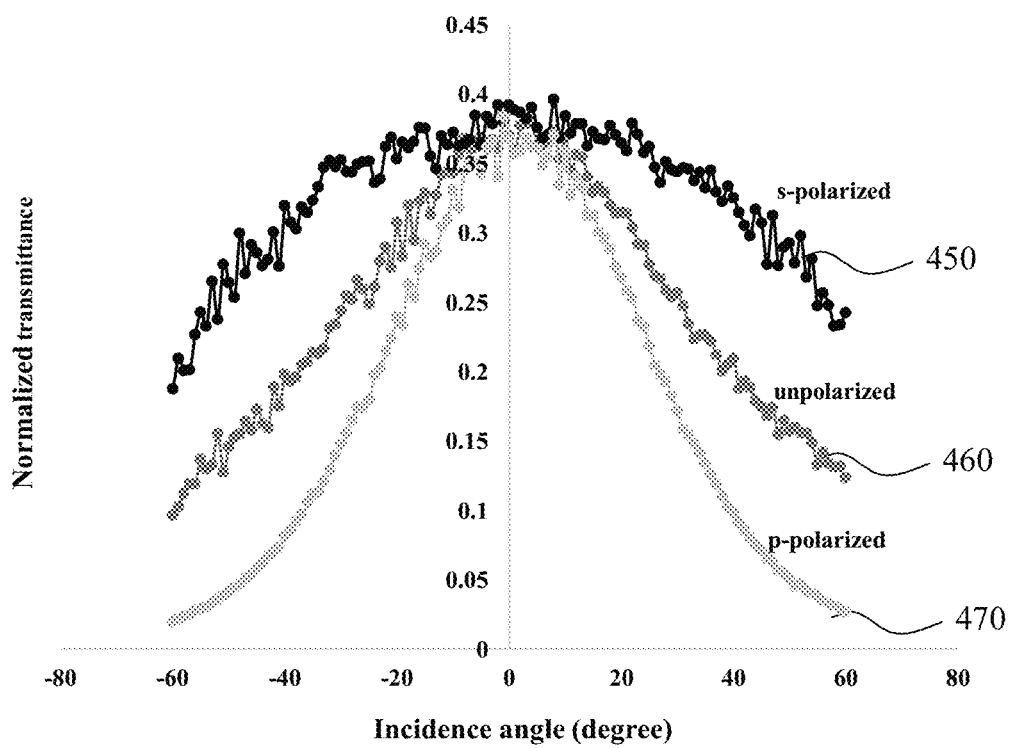
FIG. 4B illustrates incidence-angle dependent transmittance of the angularly selective dimming element in FIG. 4A.

FIG. 4B illustrates experimental results of the incidence-angle dependent light transmittance of the angularly selective dimming element in FIG. 4A, for different polarization states of an incident light. The horizontal axis and the vertical axis represent an incidence angle (unit: degree) of the incident light and normalized transmittance of the light transmitted through the angularly selective dimming element 400, respectively. Curve 450, curve 460 and curve 470 represent the incidence-angle dependent light transmittance of the angularly selective dimming element for an s-polarized incident light, a unpolarized incident light, and a p-polarized incident light, respectively.

Referring to FIG. 4A and FIG. 4B, for a substantially normally incident light (i.e., the incidence angle is approximately or equal to 0°), the light absorption caused by the dichroic dyes 408 in the angularly selective dimming element 400 may be minimal, because the E-field of the incident light may be perpendicular to the absorption axis of the molecules of the positive dichroic dyes 408 regardless of the polarization of the incident light. The p-polarized light, s-polarized light, and unpolarized light all have about 40% transmittance. An arbitrary linearly polarized light can be decomposed into a p-polarized component and an s-polarized component.

When the incidence angle increases, the absorption caused by the positive dichroic dyes 408 may gradually increase, because the E-field of the incident light determining polarization direction of the incident light may trend to be parallel to the absorption axis of the molecules of the positive dichroic dyes 408. The angularly selective dimming element 400 may significantly attenuated or completely blocked the obliquely incident light having a high incidence angle (e.g., larger than 60°). In other words, the light transmittance of the angularly selective dimming element 400 may decrease with the incidence angle. For example, as shown in FIG. 4B, when the incidence angle increases from 0° to about 60°, the normalized transmittance decreases from about 0.4 to 0.025 for a p-polarized incident light, from about 0.4 to 0.12 for a unpolarized incident light, and from about 0.4 to 0.25 for an s-polarized incident light.

It should be noted that, the experimental results of the incidence-angle dependent light transmittance of the angularly selective dimming element 400 are for illustrative purposes and are not intended to limit the scope of the present disclosure. The absorption of the angularly selective dimming element 400 may vary according to various factors, such as the dye materials, the dye concentration, and/or the thickness of the LC layer.

Thus, through configuring various parameters of the angularly selective dimming element 400, such as the dye materials, the dye concentration, and/or the thickness of the LC layer, the angularly selective dimming element 400 may be allowed to weakly absorb the substantially normally incident light, but significantly absorb or completely absorb the obliquely incident light having a substantially high incidence angle (e.g., larger than 60°). Accordingly, the undesired rainbow caused by the obliquely incident light having a high incidence angle (e.g., larger than 60°) may be dimmed, while the brightness of the desired see-through image may be only slightly reduced.

According to FIG. 4B, the angularly selective dimming element 400 may exhibit the strongest angular dependence for a p-polarized incident light. In other words, the angularly selective dimming element 400 may provide a fastest decreasing speed of the light transmittance for the p-polarized incident light when the incidence angle increases. Given a same incidence angle, the p-polarized incident light may have the lowest normalized transmittance, the s-polarized incident light may have the highest normalized transmittance, and the unpolarized incident light may have the medium normalized transmittance. That is, the p-polarized incident light may be maximumly absorbed by the angularly selective dimming element 400. Thus, to enhance the effect of angularly selectivity, the angularly selective dimming element 400 may be optically coupled with a linear polarizer transmitting p-polarized light towards the angularly selective dimming element 400. However, the absorption of the unpolarized light may be still sufficient as shown in FIG. 4B, the normalized transmittance for the unpolarized light is about 0.12 at an incidence angle of about 60°.

Figure 5:
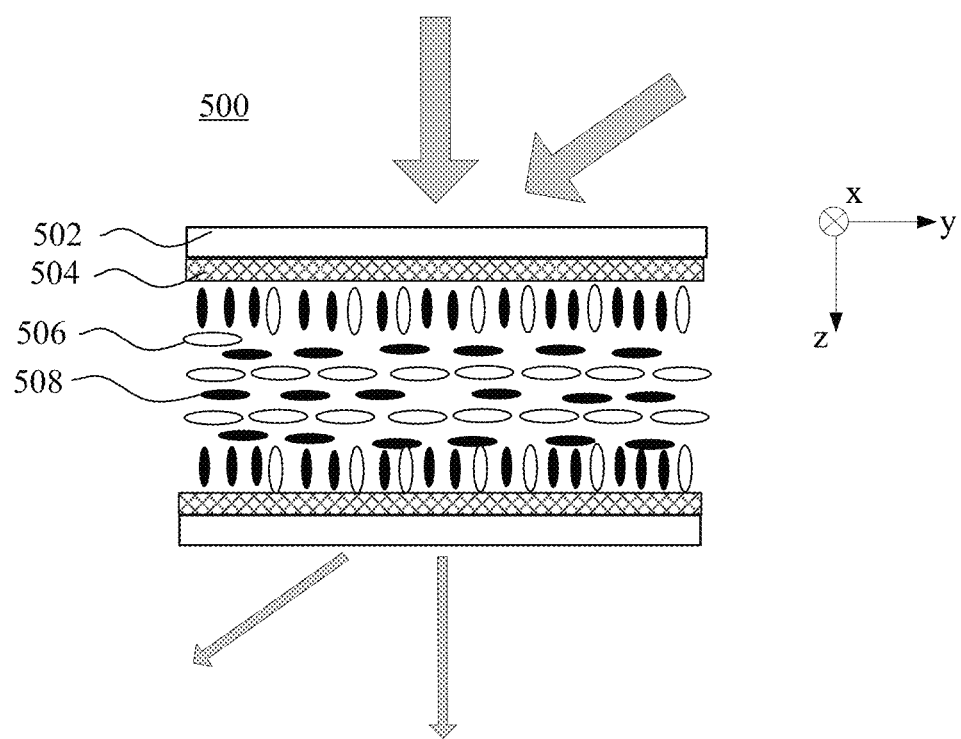
FIG. 5 illustrates a schematic diagram of an angularly selective dimming element according to another embodiment of the disclosure.

FIG. 5 illustrates a schematic diagram of another angularly selective dimming element 500 according to an embodiment of the disclosure. The similarities between FIG. 4A and FIG. 5 are not repeated, while certain differences may be explained. As shown in FIG. 5, each substrate 502 may be provided with an alignment 504 layer. LC molecules 506 may have negative dielectric anisotropy ($\Delta\varepsilon<0$) and dye molecules 508 may be positive dye molecules whose absorption axis is the long axis. The LC molecules 506 may be homeotropically aligned by the alignment layer 504, and dye molecules 508 may be aligned together with the LC molecules 506. The angular characteristics of the angularly selective dimming element 500 can be referred to the description of FIGS. 4A-4B, which are not repeated here.

Figure 6:
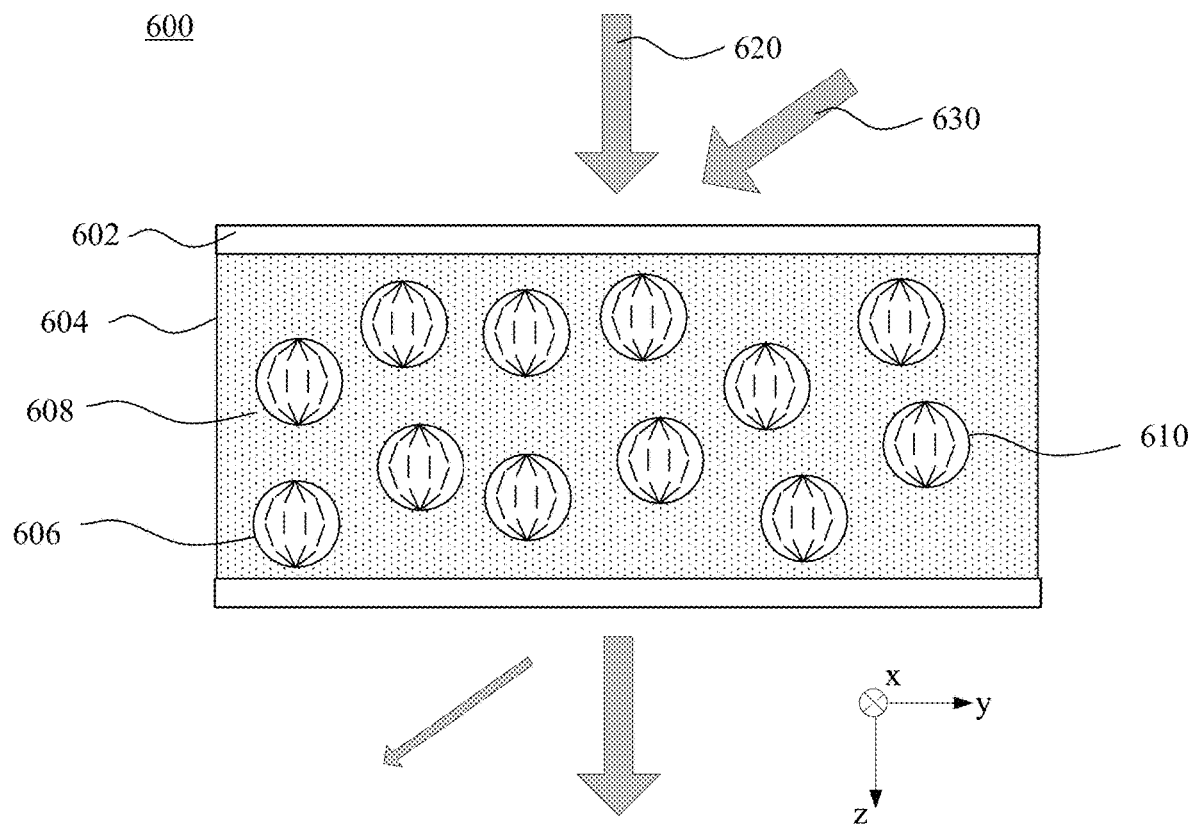
FIG. 6 illustrates a schematic diagram of an angularly selective dimming element according to another embodiment of the disclosure.

FIG. 6 illustrates a schematic diagram of another angularly selective dimming element 600 according to an embodiment of the disclosure. The angularly selective dimming element 600 may be configured to attenuate the incident light with an incidence angle through scattering. As shown in FIG. 6, the angularly selective dimming element 600 may include two opposite substrates 602 and a layer of polymer dispersed liquid crystal (PDLC) composite (also referred to as a PDLC layer 604) sandwiched between the two opposite substrates 602. The PDLC layer 604 may include micro-sized LC droplets 606 randomly dispersed in an optically isotropic polymer matrix 608, where each LC droplet 606 may have a bipolar configuration that exhibits a dielectric anisotropy. Further, LC molecules 610 in the LC droplets 606 may be homeotropically aligned, which may be realized by, for example, a homeotropic anchoring condition at the substrates 602 or at the phase separation under an external electric or magnetic field. The PDLC layer 604 may be prepared in different ways, such as prepared by an encapsulation from the emulsion of LCs in a liquid, a polymerization-induced phase separation process (e.g., ultraviolet (UV) or thermal polymerization), or infiltrating LCs in a membrane film containing through pores oriented in the direction of the normal of the membrane film.

In addition, the ordinary refractive index ($n_o$) of the LCs may be chosen to be close to the refractive index ($n_p$) of the polymer forming the polymer matrix 608 for a substantially normally incident light 620. Due to the refractive index match between the LCs and the polymer, the scattering of the substantially normally incident light 620 may be minimal. When the incidence angle increases, the refractive index mismatch encountered by an obliquely incident light 630 at the LC/polymer interface may also increase and, thus, the scattering experienced by the obliquely incident light 630 may grow with the incidence angle. Such a phenomenon is known as off-axis haze, which may increase as the birefringence ($\Delta n$) of the LCs in the LC droplets 606 increases, i.e., the scattering of the obliquely incident light 630 may increase as the birefringence ($\Delta n$) of the LCs increases.

Through configuring various parameters of the PDLC layer 604, such as the LC materials in the PDLC layer 604, the thickness of the PDLC layer 604, the concentration of the LC materials in the PDLC layer 604, and/or the fabrication process of the PDLC layer 604, the angularly selective dimming element 600 may be allowed to weakly scatter the substantially normally incident light 620, and significantly scatter or completely scatter the obliquely incident light 630 having a substantially high incidence angle (e.g., larger than 60°). Accordingly, the desired rainbow caused by the obliquely incident light 630 having a high incidence angle (e.g., larger than 60°) may be dimmed, while the brightness of the desired see-through image may be only slightly reduced.

The angular dependence of the angularly selective dimming element 600 may be polarized selective. In some embodiments, the light scattering provided by the angularly selective dimming element 600 may be maximized for a p-polarized incident light as compared to an s-polarized incident light and a unpolarized incident light, however, the light scattering for a unpolarized incident light may also be essential to dim the light incident under large angle which gives rainbow artifacts in result of diffraction.

Figure 7:
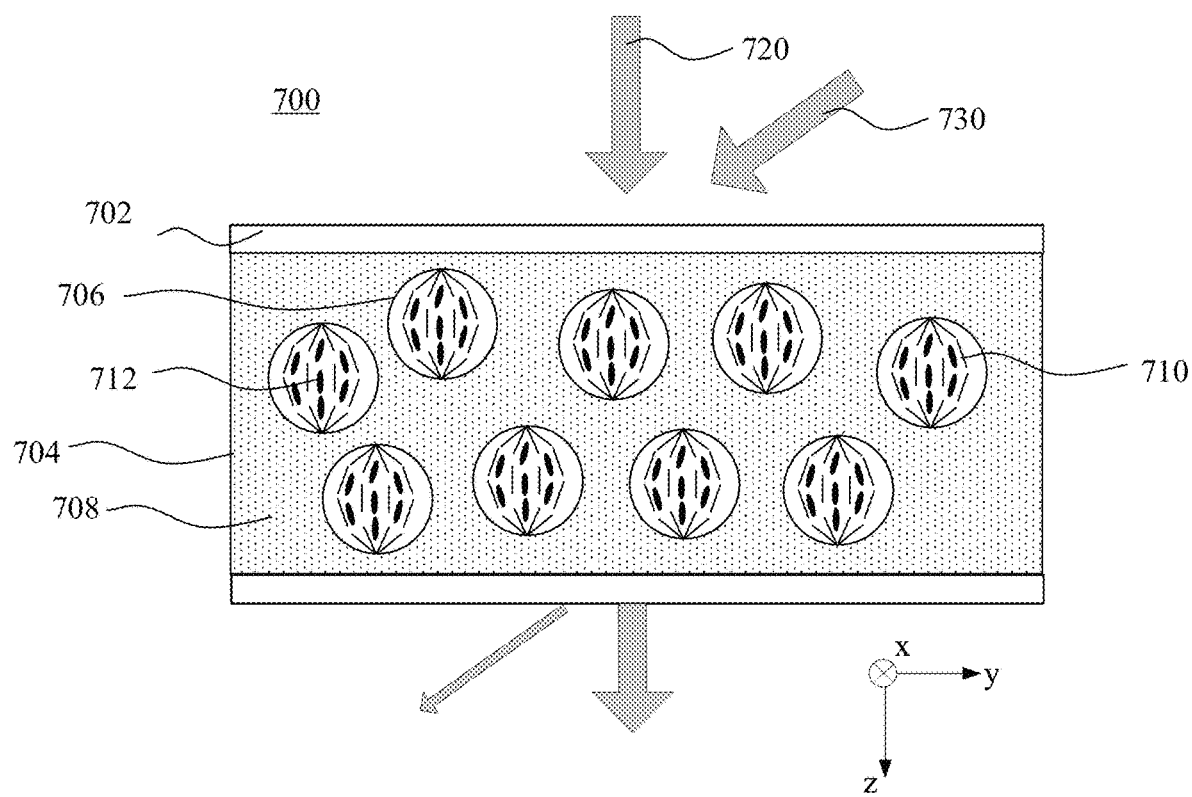
FIG. 7 illustrates a schematic diagram of an angularly selective dimming element according to another embodiment of the disclosure.

In some embodiments, the attenuation of the obliquely incident light 630 having a substantially high incidence angle (e.g., larger than 60°) may be enhanced by doping dyes (e.g., dichroic dyes) into the PDLC layer 604, due to the angular dependence of the light absorption of the dichroic dyes discussed in FIGS. 4A-4B. A corresponding structure is shown in FIG. 7. FIG. 7 illustrates a schematic diagram of an LC-based angularly selective dimming element 700 according to an embodiment of the disclosure. The angularly selective dimming element 700 may be configured to attenuate the incident light with an incidence angle through both absorption and scattering. The similarities between FIG. 7 and FIG. 6 are not repeated, while certain difference may be explained.

As shown in FIG. 7, the angularly selective dimming element 700 may include two opposite substrates 702 and a composite layer 704 sandwiched between the two substrates 702. The composite layer 704 may be a PDLC layer doped with dyes (e.g., dichroic dyes) 712, and the PDLC layer may include micro-sized LC droplets 706 randomly dispersed in an optically isotropic polymer matrix 708, where the micro-sized LC droplets 706 are doped with the dichroic dyes 712. LC molecules 710 in the LC droplets 706 may be homeotropically aligned, and the dichroic dyes 712 may be aligned with the LC molecules 710. The ordinary refractive index ($n_o$) of LCs may be chosen to be close to the refractive index ($n_p$) of the polymer forming the polymer matrix 708 for a substantially normally incident light 720.

As discussed above in FIGS. 4A-4B and FIG. 6, the light absorption and light scattering of a normally incident light 720 caused by the angularly selective dimming element 700 may be both minimal, because of the crossed absorption axis (e.g., long axis) of the positive dichroic dyes 712 and the E-field of the normally incident light 720, and the refractive index match between the LCs and the polymer matrix material. When the incidence angle increases, due to the angular dependence of the light scattering of the PDLC layer and the angular dependence of the light absorption of the dichroic dyes 712, both the scattering and absorption of an obliquely incident light 730 caused by the angularly selective dimming element 700 may increase accordingly. That is, the attenuation of the obliquely incident light 730 caused by the angularly selective dimming element 700 may increase as the incidence angle increases, and the light transmittance may decrease accordingly.

Thus, through configuring various parameters of the composite layer 704, such as the LC materials, the concentration of the LC materials and the dichroic dyes 712 in the composite layer 704, the thickness of the composite layer 704, and/or the fabrication process of the composite layer 704, the angularly selective dimming element 700 may be allowed to slightly attenuate the substantially normally incident light 720, but significantly attenuate or completely block the obliquely incident light 730 having a substantially high incidence angle (e.g., larger than 60°). Accordingly, the undesired rainbow caused by the obliquely incident light 730 having a large incidence angle (e.g., larger than 60°) may be dimmed, while the brightness of the desired see-through images may be only slightly reduced.

In the disclosed embodiments, for illustrative purposes, the angularly selective dimming elements are proposed here for waveguide-based AR devices. However, the angularly selective dimming elements may also be effective for the AR displays with other diffractive combiners, such as a holographic combiner used in retina projection displays. The holographic combiner may be a holographic optical element (HOE) that superimposes a virtual image on a real scene. In some embodiments, the HOE may be a diffraction grating prepared by the holography techniques. The appropriate intensities of both a real-world object and a diffracted image may be seen simultaneously. The angularly selective dimming element may be disposed at a side of the HOE combiner facing the real world, the real-world light may be transmitted through the angularly selective dimming element towards the HOE combiner. Thus, the undesired rainbow caused by the HOE combiner may be dimmed while the brightness of the desired see-through views may be only slightly reduced.

Figure 8:
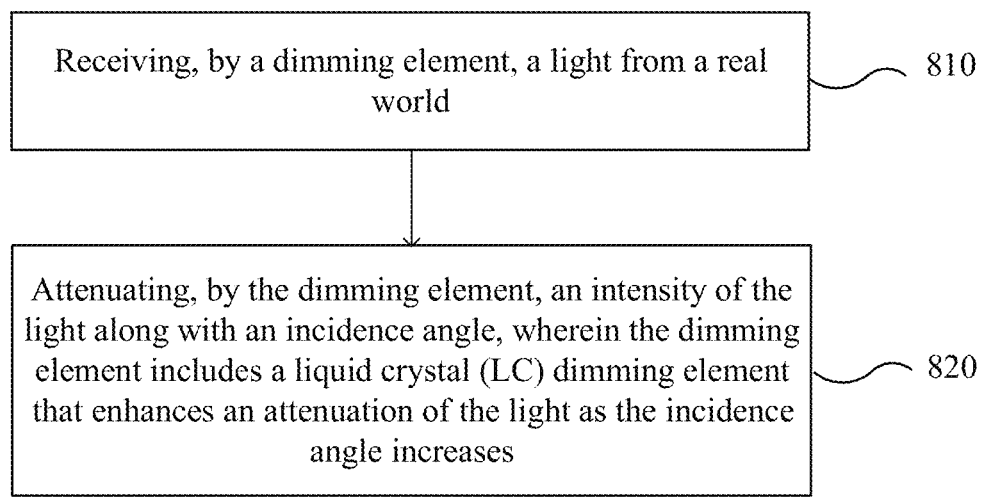
FIG. 8 illustrates a flow chart of a method to suppress a rainbow effect according to an embodiment of the disclosure.

The present disclosure may also provide a method to suppress a rainbow effect in an AR display caused by unintended diffraction of a light, for example, a light coming from the real world (i.e., a real-world light). FIG. 8 illustrates a flow chart 800 of a method to suppress a rainbow effect according to an embodiment of the disclosure. As shown in FIG. 8, the method may include receiving, by a dimming element, a light from a real world (S810). The method may further include attenuating, by the dimming element, an intensity of the light with an incidence angle (S820). The dimming element may include a liquid crystal (LC) dimming element that enhances an attenuation of the light as the incidence angle increases. In some embodiments, the method may further include converting, by a linear polarizer, the light from the real world to a linear polarized light. In some embodiments, the method may further include attenuating, by a tunable dimming element, the light from the real world depending on brightness of the real world. The details of the LC dimming element can be referred to the description of the devices, which are not repeated here.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method, comprising:
    receiving, by a liquid crystal (LC) dimming element, a light from a real world environment;
    attenuating, by the LC dimming element, an intensity of the light according to an angular attenuation profile including a polarization independent trend of increasing an attenuation as an incidence angle of the light increases, wherein according to the polarization independent trend, the attenuation increases as the incidence angle increases when the light has a first polarization, and the attenuation increases as the incidence angle increases when the light has a second polarization; and diffracting, by a diffraction element, the light attenuated by the LC dimming element.

2. The method of claim 1, further comprising:
converting, by a linear polarizer, the light from the real world environment to a linearly polarized light to be received by the LC dimming element.

3. The method of claim 1, wherein:
the LC dimming element is a first dimming element,
the method further comprises:
attenuating, by a second, tunable dimming element, the light from the real world environment depending on a brightness of the light from the real world environment.

4. The method of claim 1, wherein the LC dimming element includes a homeotropically aligned guest-host LC layer with a dichroic dye as a guest.

5. The method of claim 1, wherein
the LC dimming element includes a film of a polymer dispersed liquid crystal with homeotropically aligned LC droplets disposed in a polymer matrix having a refractive index substantially matching an ordinary refractive index ($n_o$) of LCs.

6. The method of claim 1, wherein
the LC dimming element includes a membrane with through pores oriented perpendicularly to a membrane plane,
the membrane is infiltrated with LCs, and
a refractive index of the LCs substantially matches a refractive index of the membrane for a substantially normally incident light.

7. The method of claim 6, wherein the LC dimming element includes a dichroic dye.

8. The method of claim 1, wherein the first polarization and the second polarization are orthogonal linear polarizations.

9. A device, comprising:
a diffraction element configured to diffract a light from a real world environment; and
a liquid crystal (LC) dimming element configured to attenuate an intensity of the light before the light is incident onto the diffraction element according to an angular attenuation profile including a polarization independent trend of increasing an attenuation as an incidence angle of the light increases, wherein according to the polarization independent trend, the attenuation increases as the incidence angle increases when the light has a first polarization, and the attenuation increases as the incidence angle increases when the light has a second polarization.

10. The device of claim 9, wherein the LC dimming element is a passive element.

11. The device of claim 9, wherein the LC dimming element is disposed in front of the diffraction element included in the device in an optical series along an optical path of the light from the real world environment.

12. The device of claim 9, further comprising a waveguide coupled with the LC dimming element and the diffraction element.

13. The device of claim 9, further comprising:
a linear polarizer configured to convert the light from the real world environment to a linearly polarized light before the light is incident onto the LC dimming element.

14. The device of claim 9, wherein:
the LC dimming element is a first dimming element, the device further comprises a second, tunable dimming element configured to attenuate the light from the real world environment depending on a brightness of the light from the real world environment.

15. The device of claim 9, wherein the LC dimming element includes a homeotropically aligned guest-host LC layer.

16. The device of claim 9, wherein
the LC dimming element includes a layer of liquid crystal-polymer composite having homeotropically aligned LC droplets disposed in a polymer matrix, and
an ordinary refractive index ($n_o$) of LCs substantially matches a refractive index of the polymer matrix for a substantially normally incident light.

17. The device of claim 16, wherein the LC dimming element includes a dichroic dye.

18. The device of claim 9, wherein
the LC dimming element includes a membrane with though pores oriented perpendicularly to a membrane plane,
the membrane is infiltrated with LCs, and
a refractive index of the LCs substantially matches a refractive index of the membrane for a substantially normally incident light.

19. The device of claim 18, wherein the LC dimming element includes a dichroic dye.

20. The device of claim 9, wherein the LC dimming element is an active element having the angular attenuation profile tunable by an external field applied to the LC dimming element.

* * * * *